(12) United States Patent
Szum et al.

(10) Patent No.: US 6,391,459 B1
(45) Date of Patent: May 21, 2002

(54) RADIATION CURABLE OLIGOMERS CONTAINING ALKOXYLATED FLUORINATED POLYOLS

(75) Inventors: David M. Szum, Marengo; Kevin P. Murray, Hoffman Estates; John M. Zimmerman, Crystal Lake, all of IL (US)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 08/238,801

(22) Filed: May 6, 1994

Related U.S. Application Data

(63) Continuation of application No. 07/871,238, filed on Apr. 20, 1992, now abandoned.

(51) Int. Cl.$^7$ ............................................... B32B 27/00
(52) U.S. Cl. .................. 428/421; 428/423.1; 428/424.2
(58) Field of Search ............................... 428/411.1, 421, 428/424.2, 423.1; 427/375, 393.4, 165; 525/121, 129, 920; 528/70

(56) References Cited

U.S. PATENT DOCUMENTS

| | | | |
|---|---|---|---|
| 3,766,251 A | | 10/1973 | Caporiccio et al. |
| 3,814,741 A | | 6/1974 | Caporiccio et al. |
| 3,864,318 A | | 2/1975 | Caporiccio et al. |
| 3,895,035 A | * | 7/1975 | Schultz et al. ................ 428/96 |
| 3,987,227 A | * | 10/1976 | Shultz et al. |
| 4,029,585 A | * | 6/1977 | Dettre et al. ................ 427/375 |
| 4,054,592 A | * | 10/1977 | Dear et al. |
| 4,054,695 A | * | 10/1977 | Johnson .................... 427/393.4 |
| 4,157,358 A | * | 6/1979 | Field et al. |
| 4,511,209 A | | 4/1985 | Skutnik |
| 4,537,824 A | * | 8/1985 | Asano et al. ................ 427/128 |
| 4,681,925 A | | 7/1987 | Strepparola et al. |
| 4,968,116 A | * | 11/1990 | Hulme-Lowe et al. |
| 5,011,979 A | | 4/1991 | Gregorio et al. |
| 5,022,737 A | | 6/1991 | Yamamoto et al. |

FOREIGN PATENT DOCUMENTS

| | | |
|---|---|---|
| EP | 193 370 | 9/1986 |
| EP | 251 334 | 1/1988 |
| EP | 259 980 | 3/1988 |
| EP | 0 273 449 | 7/1988 |
| EP | 0 322 624 A1 | 7/1989 |
| EP | 0 379 462 A3 | 4/1990 |
| EP | 0 379 462 | 7/1990 |
| EP | 394 927 | 10/1990 |
| EP | 0 565 425 A1 | 10/1993 |
| FR | 2 453 871 | 11/1980 |

OTHER PUBLICATIONS

Abstract, 91–374142/51, Japan.
Abstract, 91–277142/38, Japan.
Abstract, 90–070603/10, Japan.
Abstract, 96–179325/18; Japan.

\* cited by examiner

*Primary Examiner*—Merrick Dixon
(74) *Attorney, Agent, or Firm*—Pillsbury Winthrop LLP

(57) ABSTRACT

A radiation-curable composition is disclosed. An fluorinated oligomer is combined with a diluent monomer and a photoinitiator to form the radiation-curable coating composition. The fluorinated oligomer is substantially free of isocyanate groups. The radiation-curable compositions provide a suitable coating for substrates, are resistant to penetration by water and liquid hydrocarbons, retain their physical properties over a wide temperature range and exhibit immeasurably low surface friction properties.

9 Claims, 3 Drawing Sheets

RADIATION CURABLE OLIGOMERS CONTAINING ALKOXYLATED FLUORINATED POLYOLS

This application is a Continuation of application Ser. No. 07/871,238, filed on Apr. 20,1992, now abandoned.

TECHNICAL FIELD

This invention is directed to radiation curable oligomer compositions that are useful as coatings for various substrates.

BACKGROUND OF THE INVENTION

There are many applications that require radiation curable coating compositions that are optically clear and resist penetration or absorption by water or chemicals. For example, barrier coatings and coatings for optical glass fibers should have these properties. Furthermore, barrier coatings and coatings for optical fibers should retain these properties over a broad temperature range.

Fluorine-containing polymers are very resistant to penetration by water and chemicals and therefore are well suited for use as barrier coatings. A patent application disclosing fluoropolymer claddings for optical fibers, designated AD-DO14 140 to Klinger et al., was published by the Office of the Chief of Naval Research on May 12, 1989. The cis-trans fluoropolyol polyacrylate coating is referred to therein as an infinite network fluoropolymer. As a result, the fluoropolymers disclosed in the Klinger et al. application have a very high molecular weight. These very high molecular weight fluoropolyol polyacrylate polymers, when used in coating compositions, are not easily applied to substrates.

U.S. Pat. No. 4,968,116discloses optical fiber coating compositions that comprise a fluorinated mono acrylate, a polyfunctional cross-linking acrylate and a photoinitiator.

SUMMARY OF THE INVENTION

The present invention is directed to radiation curable oligomer compositions that are curable by a free radical or a cationic mechanism.

The compositions of the present invention comprise a fluorinated urethane oligomer; at least one diluent monomer; and a photoinitiator. The fluorinated urethane oligomer is the reaction product of a fluorinated polyol, a polyisocyanate and an isocyanate reactive monomer containing ethylenic unsaturation. The isocyanate reactive monomer is preferably a (meth)acrylate, vinyl ether, maleate or fumarate. The diluent monomer is preferably a fluorinated monomer. The fluorinated urethane oligomer has a molecular weight in the range of about 700 to about 10,000, preferably about 1000 to about 5000.

The present invention also relates to methods of applying the above compositions to substrates and to substrates coated with the above compositions.

DETAILED DESCRIPTION OF THE PRESENT INVENTION

Figure 1:
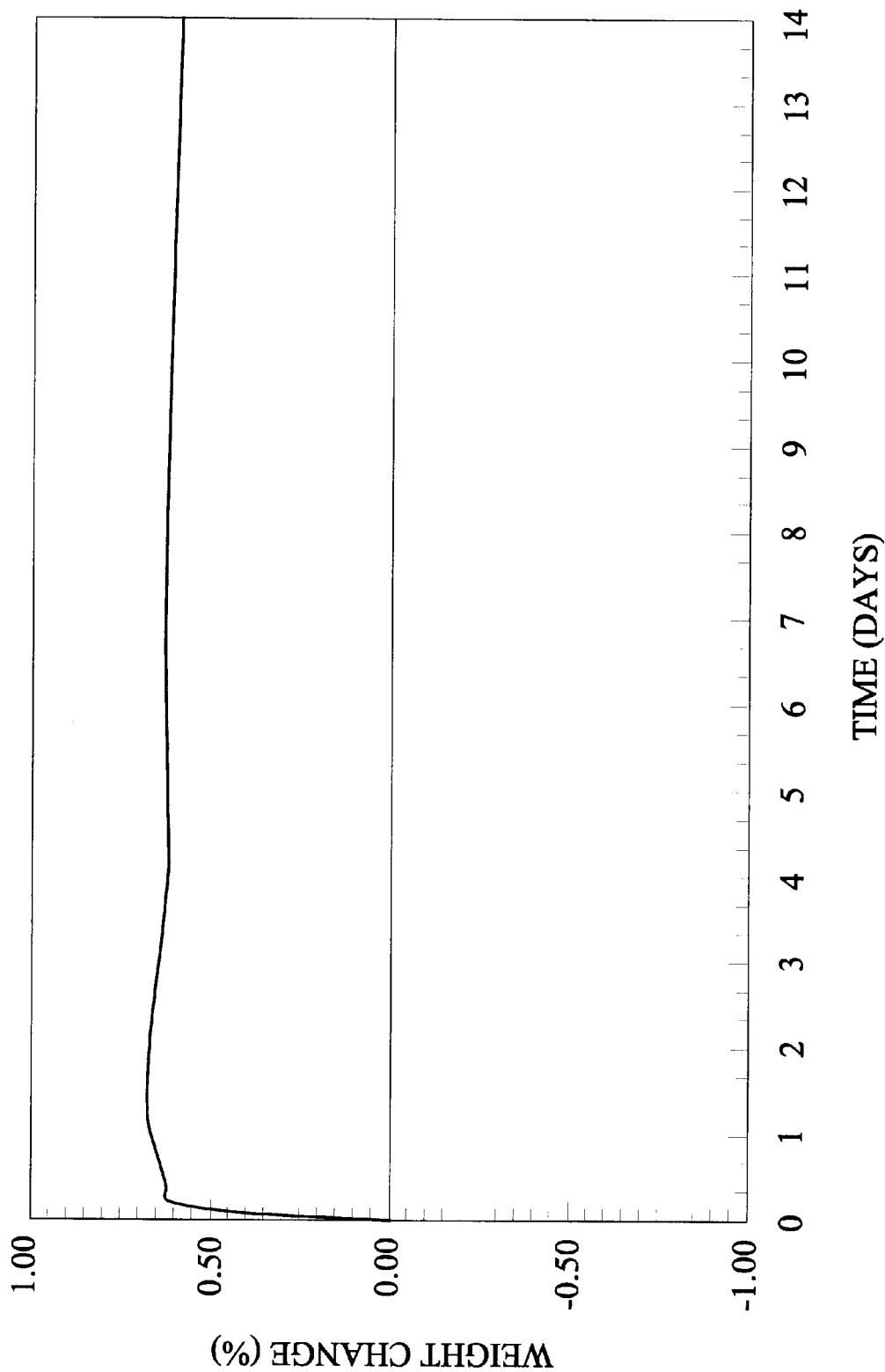
FIG. 1 illustrates the water-insensitivity of the coating composition of the present invention as indicated by the graph of weight change in water versus time.

The fluorinated oligomers useful in the compositions of the present invention are the reaction product of a fluorinated polyol, a polyisocyanate and an isocyanate reactive monomer containing ethylenic unsaturation. The resulting oligomers have molecular weights that are generally in the range of about 700 to about 10,000, preferably about 1000 to about 5000. They are also substantially free of isocyanate functionality. These fluorinated oligomers are combined with a diluent and a photoinitiator to form the radiation curable compositions of the present invention.

The fluorinated polyols which are reacted with a polyisocyanate and endcapped with a functional compound containing ethylenic unsaturation to make the compositions of the present invention preferably include fluorinated polymethylene oxide, polyethylene oxide, polypropylene and polytetramethylene oxide or copolymers thereof endcapped with ethylene oxide. The preferred fluorinated polyols are the Fomblin Z-Dol TX series of products, marketed by Ausimont USA, Inc. These polyols are fluorinated poly (ethylene oxide-methylene oxide) copolymers endcapped with ethylene oxide.

Other suitable fluorinated polyols include polyols such as L-12075 marketed by 3M Corporation and the MPD series of polyols marketed by DuPont.

Any of a wide variety of organic polyisocyanates, alone or in admixture, can be reacted with the fluorinated polyols and ethylenically unsaturated isocyanate reactive compounds to form the endcapped fluorinated oligomers of the present invention. Diisocyanates are the preferred polyisocyanates. Representative diisocyanates include isophorone diisocyanate (IPDI), toluene diisocyanate (TDI), diphenylmethylene diisocyanate, hexamethylene diisocyanate, cyclohexylene diisocyanate, methylene dicyclohexane diisocyanate, 2,2,4-trimethyl hexamethylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, and polyalkyloxide and polyester glycol diisocyanates such as polytetramethylene ether glycol terminated with TDI and polyethylene adipate terminated with TDI, respectively. The preferred isocyanate is IPDI.

The fluorinated polyol and polyisocyanate are combined in a weight ratio of about 1.5:1 to about 7.5:1 fluorinated polyol to polyisocyanate. The fluorinated polyol and polyisocyanate are reacted in the presence of a catalyst to facilitate the reaction. Catalysts for the urethane reaction, such as dibutyltin dilaurate and the like, are suitable for this purpose.

The isocyanate-terminated prepolymers are endcapped by reaction with an isocyanate reactive functional monomer containing an ethylenically unsaturated functional group. The ethylenically unsaturated functional groups are preferably acrylates, vinyl ethers, maleates, fumarates or other similar compounds.

Suitable monomers that are useful to endcap the isocyanate terminated prepolymers with the desired (meth) acrylate functional groups include hydroxy functional acrylates such as 2-hydroxy ethyl acrylate, 2-hydroxy propyl acrylate and the like.

Suitable monomers which are useful to endcap the isocyanate terminated prepolymers with the desired vinyl ether functional groups include 4-hydroxybutyl vinyl ether, triethylene glycol monovinyl ether and 1,4-cyclohexane dimethylol monovinyl ether. Suitable monomers which are useful to endcap the prepolymers with the desired maleate functional group, include maleic acid and hydroxy functional maleates.

Preferably, there is a sufficient amount of isocyanate reactive functionality in the monomer containing acrylate, maleate, vinyl ether or other ethylenically unsaturated groups to react with any residual isocyanate functionality remaining in the prepolymer and endcap the prepolymer with the desired functional group. The term "endcap" means that a functional group caps each of the two ends of the prepolymer.

The isocyanate reactive ethylenically unsaturated monomer is reacted with the reaction product of the fluorinated polyol and the isocyanate. The reaction preferably takes place in the presence of an antioxidant such as butylated hydroxytoluene (BHT) and the like.

In the reaction between hydroxy and isocyanate groups, it is preferred to employ a stoichiometric balance between hydroxy and isocyanate functionality and to maintain the reactants at an elevated reaction temperature of at least about 40° C. until the isocyanate functionality is substantially consumed. This also indicates the hydroxy functionality is similarly consumed. The mole ratio of the polyether/isocyanate reaction product to the ethylenically unsaturated monomer is 0.5:1.

The resulting alkoxylated fluorinated oligomer preferably comprises about 30 weight percent to about 90 weight percent of the coating composition of the present invention and more preferably about 30 to about 80 weight percent of the coating composition.

The fluorinated oligomers used in the composition of the present invention have a viscosity of about 10,000 centipoise to about 10,000,000 centipoise. The fluorinated oligomers are preferably combined with a diluent monomer to reduce their viscosity and make them more readily applied as coatings. The diluent monomer acts as a solvent to reduce the viscosity of the fluorinated oligomer by forming a solution. The diluent monomers are preferably fluorinated to impart the optimum properties to the coating composition.

Representative diluent monomers include the following fluorinated acrylate monomers:

2,2,3,3-tetrafluoropropyl acrylate which can be commercially obtained from the Polysciences Corporation in Warrington, Pa. and from the PCR Corporation in Gainesville, Fla., designated as item number 07578 in the Polysciences Catalog and item number 12432-1 in the PCR Catalog;

1H,1H,5H-octafluoropentyl acrylate which can be commercially obtained from the Polysciences Corporation in Warrington, Pa., designated as item number 21044 in the Polysciences Catalog;

1H,1H,2H,2H-heptadecafluorodecyl acrylate which can be commercially obtained from the Polysciences Corporation in Warrington, Pa., designated as item number 19227 in the Polysciences Catalog;

a cyclic composition designated by the formula:

which can be commercially obtained from the Minnesota Mining and Manufacturing Company (3M) in St. Paul, Minn., designated as item number L-11619 in the 3M Catalog;

a composition designated by the formula:

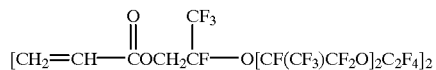

commercially obtained from the 3M Corporation, designated as item number L-12043 in the 3M Catalog;

a composition designated by the formula:

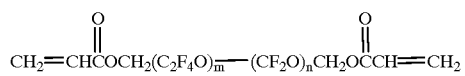

commercially obtained from the 3M Corporation, designated as item number L-9367 in the 3M Catalog; and a composition designated by the formula:

which can be commercially obtained from the 3M Corporation, designated as FX-189 in the 3M Catalog.

The diluents preferably comprise about 5 to about 68 weight percent based on the total weight of the coating composition of the present invention.

When the compositions of the present invention are cured by exposing them to actinic energy of appropriate wavelength, such as ultraviolet light, a photoinitiator is admixed with the fluorinated oligomer solution. Preferred photoinitiators include hydroxy- or alkoxy-functional acetophenone derivatives, preferably hydroxyalkyl phenyl ketones, or benzoyl diaryl phosphine oxides. Oligomers having the two different types of ethylenic unsaturation, i.e., the vinyl ether group and another ethylenically unsaturated group, copolymerize rapidly in the presence of these photoinitiators to provide a rapid photocure and also interact rapidly upon exposure to other types of energy when no polymerization initiator is present.

The acetophenone derivatives that may be used have the Formula I:

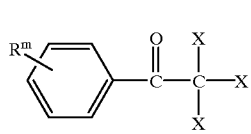

(I)

in which $R^m$ is an optional hydrocarbon substituent containing from 1 to 10 carbon atoms and which may be alkyl or aryl, e.g., methyl, ethyl, butyl, octyl or phenyl, X is selected from the group consisting of hydroxy, $C_1$ to $C_4$ alkoxy, $C_1$ to $C_8$ alkyl, cycloalkyl, halogen, and aryl, e.g. phenyl, or 2 Xs together are cycloalkyl.

Many compounds have the required structure. The alkoxy groups are preferably methoxy and ethoxy, the cycloalkyl group is preferably cyclohexyl or phenoxy, the alkyl group is preferably cyclohexyl, and the halogen is preferably chlorine. One commercially available compound is the Ciba-Geigy product Irgacure 651 which has the Formula II:

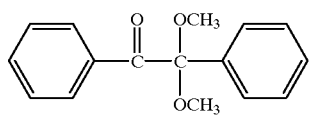

(II)

Irgacure 184, also from Ciba-Geigy, is another useful acetophenone derivative, and it has the Formula III:

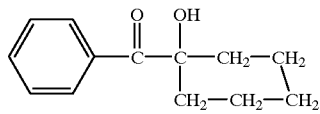

(III)

Still another commercially available useful acetophenone derivative is diethoxy acetophenone, available from Upjohn Chemicals, North Haven, Conn., which has the Formula IV:

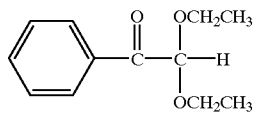

(IV)

The hydroxyalkyl phenyl ketones which are preferred herein have the Formula V:

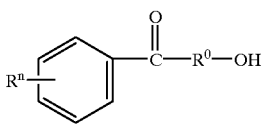

(V)

in which $R^o$ is an alkylene group containing from 2–8 carbon atoms and $R^n$ is an optional hydrocarbon substituent containing from 1 to 10 carbon atoms and which may be alkyl or aryl, e.g., methyl, ethyl, butyl, octyl or phenyl.

Particularly preferred compounds have the Formula VI:

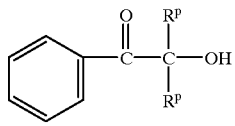

(VI)

in which each $R^p$ is independently an alkyl group containing from 1 to 4 carbon atoms. In the commercial product Darocur 1173 (available from E-M Company, Hawthorne, N.Y.), each $R^p$ is methyl. This provides a compound which can be described as 2-hydroxy-2-methyl-1-phenyl propane 1-one.

The benzoyl diaryl phosphine oxide photoinitiators which may be used herein have the Formula VII:

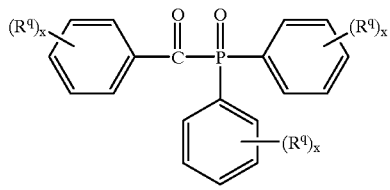

(VII)

In Formula VII, $R^q$ is an optional hydrocarbon substituent containing from 1 to 10 carbon atoms and may be alkyl or aryl as previously noted, and each x is independently an integer from 1 to 3. In preferred practice, a 2,4,6-trimethyl benzoyl compound is used, and the two aromatic groups connected to the phosphorus atom are phenyl groups. This provides the compound 2,4,6-trimethyl benzoyl diphenyl phosphine oxide which is available from BASF under the trade designation Lucirin TPO.

When utilized, the photoinitiator is present in an amount in the range of about 0.01 to about 10.0, preferably about 0.1 to about 6.0, weight percent based on the total weight of the composition.

Suitable sources of actinic energy include lasers and other conventional light sources having an effective energy output, e.g., mercury lamps.

The wavelength of the actinic energy extends from the ultraviolet range, through the visible light range and into the infrared range. Preferred wavelengths are about 200 to about 2,000, more preferably about 250 to about 1,000, nanometers (nm).

The amount of actinic energy utilized to solidify a 3 mil thick film is about 0.05 to about 5.0, preferably about 0.05 to about 1, Joules per square centimeter (J/sqcm).

The free-radical curable compositions of the present invention can be utilized in a variety of applications. For example, they can be utilized as coatings for many substrates such as textile fibers, polycarbonate and polyacrylic sheets, yarns, filaments and threads, fabrics, as primary and secondary optic glass fiber coatings, and as cladding for plastic optical fibers. They can also be utilized in a metallization process wherein a non-metallic substrate is provided with a metal finish, to produce objects utilizing an optical fabrication process as described in U.S. Pat. No. 4,575,330 to Hull, in composite materials, as flame retardants, residual lubricants and other applications.

The following Examples are present by way of representation, and not limitation, of the present invention.

EXAMPLE 1

Preparation of Fluorinated Oligomer with a Number Average Molecular Weight of 2000

Fomblin Z-Dol TX 3500 (Z-Dol TX 3500), [151.74 g (0.0914 eq.)] isophorone diisocyanate (IPDI) [33.96 g (0.3032 eq.)] and dibutyltin dilaurate (0.2 g) were charged into a four-necked round bottom flask fitted with a stirrer, dry air sparge, reflux condenser, thermometer, and a heating mantle on a thermostat-controlled automatic jack. The combined ingredients were maintained at 70° C. for 4 hours. The amount of free isocyanate remaining in the reaction product was measured to be 4.78 percent by a procedure in which a sample of the oligomer solution is reacted with a known amount of dibutylamine in excess. The amount of remaining dibutylamine is measured by titration with HCl, and the percent NCO is calculated. 2-hydroxyethyl acrylate (HEA)

[24.46 g (0.2107 eq.)] and butylated hydroxytoluene (0.18 g) were added to the reaction product. After one hour, the percent free isocyanate was measured again and found to be negligible (<0.1). The structure of the resultant fluorinated oligomer is schematically represented by:

HEA-(IPDI-Z Dol TX 3500)$_{0.43}$-IPDI-HEA in which the amount of IPDI-Z Dol TX 3500 is calculated by dividing the Eqs. of polyol by the Eqs. of hydroxyethyl acrylate.

EXAMPLE 2

Preparation of a Fluorinated Oligomer with a Number Average Molecular Weight of 1300

Fomblin Z-Dol TX 2000, [186.9 g (0.2212 eq.)] isophorone diisocyanate [83.70 g (0.749 eq.)] and dibutyltin dilaurate (0.2 g) were charged into a four-necked round bottom flask fitted with a stirrer, dry air sparge, reflux condenser, thermometer, and a heating mantle on a thermostat-controlled automatic jack. The contents were maintained at 70° C. for four hours. The amount of free isocyanate remaining in the reaction product was measured and found to be 7.72 weight percent. The reaction product was cooled to 60° C. BHT 0.25 g and 2-hydroxyethyl acrylate [61.3 g (0.5279 eq.)] were added to the reaction product. After one hour, the percent free isocyanate was measured again and found to be negligible (<0.1). The structure of the resultant fluorinated oligomer is represented schematically by:

HEA-(-IPDI-Z Dol TX 2000-)$_{0.42}$-IPDI-HEA.

EXAMPLE 3

Preparation of a Fluorinated Oligomer with a Number Average Molecular Weight of 1000

Fomblin Z-Dol TX 1000 [196.13 (0.3197 eq.)] isophorone diisocyanate [125.20 g (1.1199 eq.)] and dibutyltin dilaurate (0.26 g) were charged into a four-necked round bottom flask fitted with a stirrer, dry air sparge, reflux condenser, thermometer, and a heating mantle on a thermostat-controlled automatic jack. The combined ingredients were maintained at 80° C. for three hours. The amount of free isocyanate in the reaction product was measured and found to be 11.02 percent. BHT (0.29 g) and 2-hydroxyethyl acrylate [97.8 g (0.8422 eq.)] were added to the reaction product. After one hour, the percent free isocyanate was negligible (<0.1). The structure of the resultant oligomer is represented schematically by:

HEA- (-IPDI-Z Dol TX 1000-)$_{0.37}$-IPDI-HEA.

EXAMPLE 4

Coating Compositions Containing Fluorinated oligomers

Coating compositions were prepared using the fluorinated oligomers described in Examples 1 to 3. A fluorinated oligomer was combined with a diluent monomer and a photoinitiator in the amounts described in Table 1. From 35 to 78 weight percent of the fluorinated oligomer was combined with from 19 to about 62 weight percent of the reactive diluent and from 2 to about 3 weight percent of the photoinitiator.

Five coating compositions were prepared, three using the fluorinated oligomer of Example 1, one using the fluorinated oligomer of Example 2 and one using the fluorinated oligomer of Example 3.

The fluorinated oligomer, diluent monomer and photoinitiator were combined using a mixer. Each composition was applied to a glass plate and subjected to a dosage of 1 J/cm$^2$ radiation. The physical properties of the coatings thus obtained were measured thereby demonstrating the effectiveness of the coatings. The results of the measurement s s o mad e reported in Table 1 below.

TABLE 1

Properties of Cured Compositions According to the Present Invention

| Oligomer | Example 1 | Example 1 | Example 1 | Example 2 | Example 3 | Example 4 |
|---|---|---|---|---|---|---|
| (wt %) | 68% | 78% | 78% | 62% | 62% | 35% |
| Diluent Monomer | PolySci 21044 | PolySci 07578 | 3M L-11619 | 3M L-11619 | 3M L-11619 | 3M L-11619 |
| Photoinitiator | Irgacure 184 | Darocur 1173 | Irgacure 184 | Lucirin TPO | Lucirin TPO | Lucirin TPO |
| Viscosity (cP) | | | | 6300 | 4200 | 215 |
| Tensile (MPa) | 8 | 14 | 11 | 21 | 33 | |
| Elongation (%) | 69 | 58 | 46 | 36 | 13 | |
| Modulus (MPa) | 34 | 204 | 183 | 548 | 862 | |
| Liquid RI | | | | 1.3925 | 1.4119 | 1.389 |
| Film RI | | | | 1.41 | 1.431 | |
| COF (to Stainless Steel) | | | | 0.18 | 0.06 | |
| COF (Film to Film) | | | | 0.19 | 0.17 | |

The physical properties of the coatings reported in Table 1 were measured as discussed below.

Viscosity

The viscosity, expressed in centipoise (cp) was measured using a Brookfield Model RVTD viscometer operated in accordance with the instructions provided therewith. The temperature of the sample tested was 25° C.

Tensile Properties

A film for determination of the tensile properties, i.e., tensile strength Megapascals (MPa), percent elongation at break (%) and modulus at 2.5% elongation (MPa), of the coating was prepared by drawing down a 3 mil coating on glass plates using a Bird bar, commercially available from Pacific Scientific, Silver Springs, Md. An automatic draw down apparatus like a Gardner AG-3860 commercially available from Pacific Scientific, Gardner/Neotec Instrument Division, Silver Springs Md., can be utilized. The coating was cured using a "D" lamp from Fusion Curing Systems, Rockville, Md. The "D" lamp emits radiation having a wavelength of about 200 to about 470 nanometers with the peak radiation being at about 380 nanometers and the power output thereof is about 300 wats per linear inch.

The coating was cured at a dose of about 1 J/sqcm which provided complete cure. The film was then conditioned at 23±2° C. and 50±3% relative humidity for a minimum time period of 16 hours.

Six, 0.5 inch wide test specimens were cut from the film parallel to the direction of the draw down and removed from the glass plate. Triplicate measurements of the dimensions of each specimen were taken and the average utilized. The tensile properties of these specimens were then determined using a Instron Model 4201 from Instron Corp., Canton, Mass. operated in accordance with the instructions provided therewith.

COF (Coefficient of Friction)

The coefficient of friction properties of cured films are determined by the following procedure:

The cured coating, as a draw-down on a glass plate, is attached to a horizontal support table on the Instron testing instrument. The friction surface, with a dead weight load, is then drawn across the film at a specified rate, and the stress-strain recorded. The steady-state average stress value is taken from the curve and the coefficient of friction is calculated.

A Universal Testing Instrument, Instron Model 4201, or equivalent, equipped with an appropriate data system and applications software, load cell (ten pound capacity), support table with pulley, COF sled, weighing approximately 100 g, double sided transparent adhesive tape, 3M, 2.0 in width, or equivalent, blade handle, size # 4, Bard-Parker 1040 or equivalent and scalpel blades, size # 23, SGA Scientific Catalog # D-5451 or equivalent, are utilized.

To determine the film-to-film COF, the COF sled containing the coating square is placed coating side down onto the beginning of the test path with wire kept taught and permitted to travel four inches. This is repeated five times.

To determine the dynamic coefficient of friction, the system is the same except the COF sled is placed, balls down, on the cured film at the end of the selected path, with the wire taught.

Cured films for the material to be tested are prepared and cut to the size of the COF sled. The square of cured coating is attached to the smooth side of the COF sled with double-sided tape. The COF sled with and without the coating square attached, is weighed.

The instrument is set-up by installing the load cell and pneumatic action grips, installing the support table in the lower Instron fixture, setting the crosshead speed to 10.00 inches/minute, and stringing the COF sled wire along the support table and through the grooved pulley wheel. The line is attached in the upper pneumatic grip, leaving a little slack.

The COF for each replicate is calculated by dividing the replicate value by the weight of the sled. For film-to-film COF the sled weight with the coating square is used and for dynamic COF the sled weight without the coating square is used.

EXAMPLE 5

Water Resistance of Compositions of the Present Invention

Coating compositions of the present invention were prepared as discussed in Example 4 above. The compositions were immersed in water and the weight of the coating compositions was monitored over several days to determine how much water was absorbed by the film over time. As illustrated by FIG. 1, the weight of the coating composition increased only by about 0.5 weight percent almost immediately upon immersion in water and remained constant for the next two weeks thereafter, indicating that the coating composition of the present invention does not absorb a significant amount of water and therefore provides an excellent moisture barrier.

EXAMPLE 6

Hydrocarbon Resistance of Compositions of the Present Invention

Figure 2:
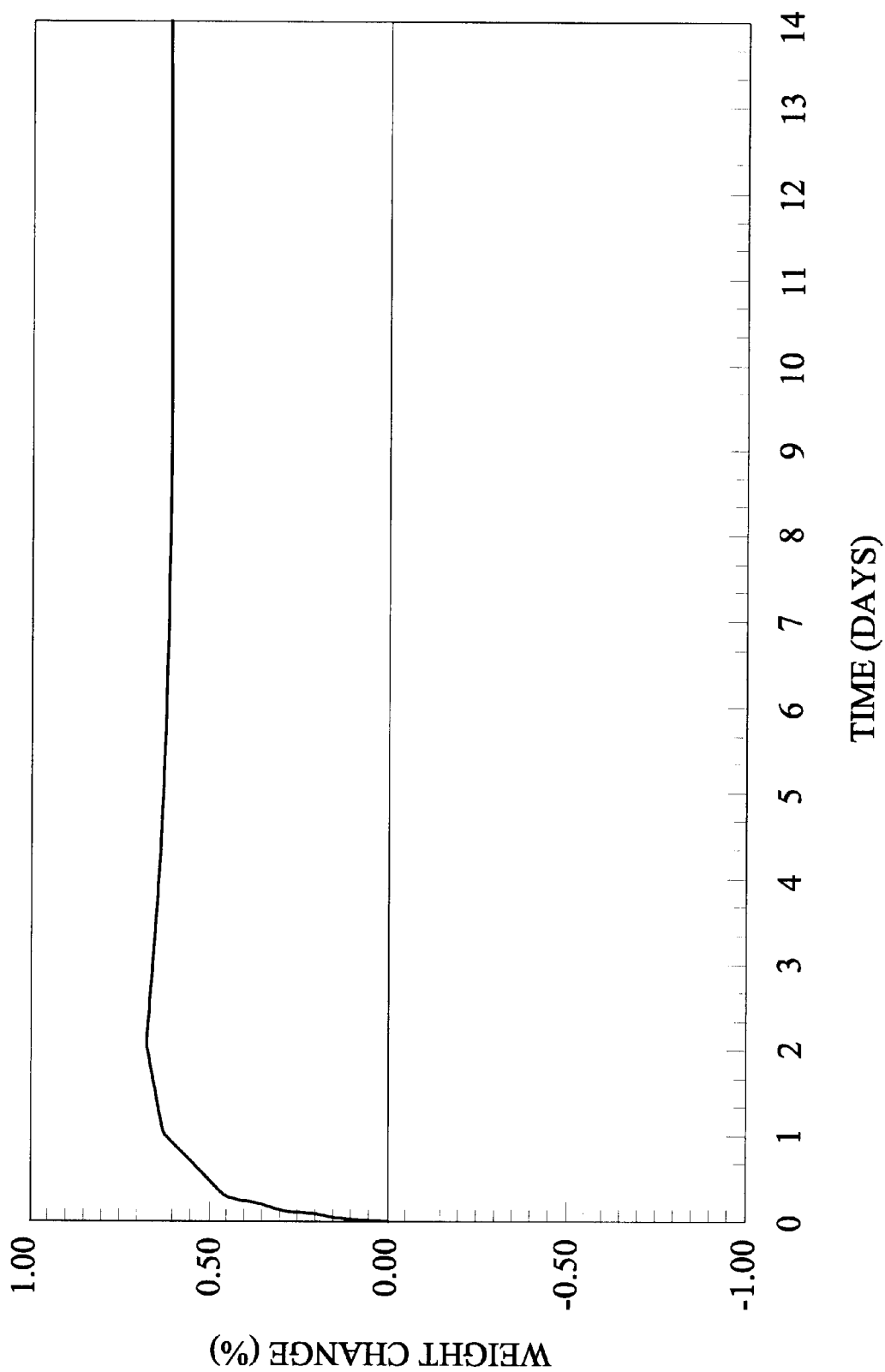
FIG. 2 illustrates the hydrocarbon insensitivity of the coating compositions of the present invention as indicated by the graph of weight change in hydrocarbon versus time.

Coating compositions of the present invention were prepared as discussed in Example 4. The compositions were then immersed in a $C_{14}$–$C_{16}$ alpha-olefin and the percent weight change of the coating compositions were monitored over time. As can be observed from FIG. 2, after an initial weight gain of about 0.65 weight percent over the first day of the trial, the weight of the compositions remained relatively constant throughout a fourteen day period. Thus, the coating composition of the present invention is relatively insensitive to hydrocarbons and provides an effective barrier to hydrocarbon penetration.

EXAMPLE 7

Effect of Temperature on the Coatings of the Present Invention

Figure 3:
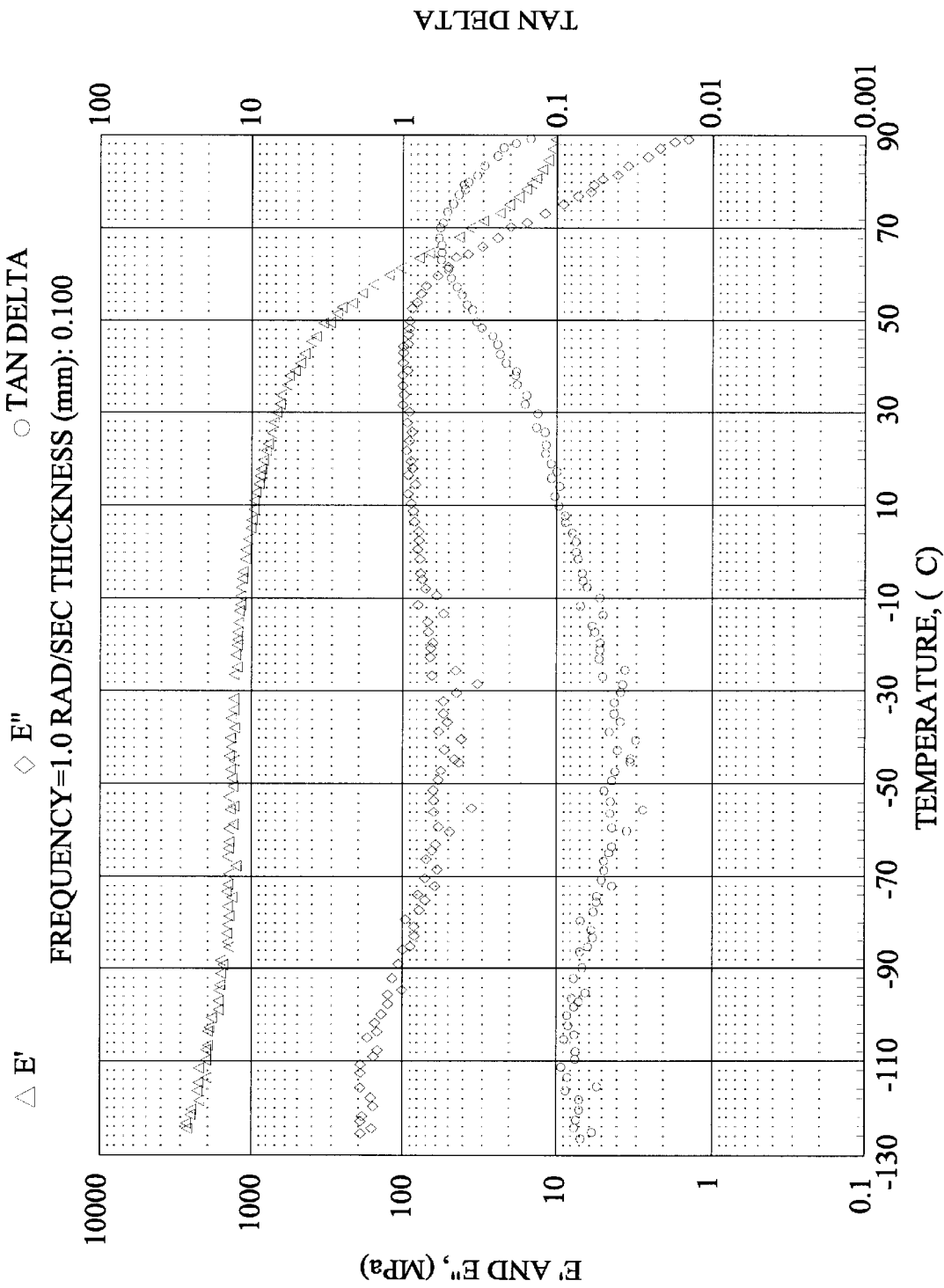
FIG. 3 illustrates the effect of temperature on the modulus of the coating compositions of the present invention.

Coating compositions of the present invention were prepared as described in Example 4. The compositions were analyzed to determine the effect of temperature on the modulus of the composition. In FIG. 3, E' refers to storage (rubbery) Modulus, E" refers to loss (viscous) Modulus and Tan Delta refers to E'/E". FIG. 3 illustrates that from about −90° C. to about 30° C., the modulus remains relatively constant. Furthermore, FIG. 3 illustrates that the composition does not become brittle until exposed to temperatures below −130° C. Thus, the compositions remain flexible over a broad temperature range.

From the foregoing, it will be observed that numerous variations and modifications may be effected without departing from the true spirit and scope of the present invention. It will be understood that no limitations with respect to the specific compositions illustrated herein is intended or should be inferred. The scope of the invention is intended to cover by the appended claims all such modifications that fall within the scope of the claims.

We claim:

1. A radiation curable composition comprising a fluorinated urethane oligomer having a molecular weight in the range of from about 700 to about 10,000 and a viscosity of about 10,000 centipoise to about 10,000,000 centipoise that is the reaction product of a fluorinated polyol, a polyisocyanate and an isocyanate reactive monomer containing an ethylenically unsaturated functional group, wherein the weight ratio of polyol to isocyanate is in the range of from about 1.5:1 to about 7.5:1, and at least one reactive diluent fluorinated monomer.

2. The composition of claim 1 wherein the oligomer is substantially free of isocyanate groups.

3. The composition of claim 1 wherein the reactive monomer containing an ethylenically unsaturated functional group is a (meth)acrylate, vinyl ether, maleate or fumarate.

4. The composition of claim 1 wherein the fluorinated polyol is endcapped with ethylene oxide.

5. The composition of claim 1 wherein the oligomer comprises about 30 to about 80 weight percent of the composition.

6. The composition of claim 1 wherein the reactive diluent monomer comprises about 5 to about 68 weight percent of the composition.

7. The composition of claim 1 that further comprises a photoinitiator.

8. The composition of claim 7 wherein the photoinitiator is a hydroxy-functional acetophenone, an alkoxy-functional acetophenone or a benzoyl diaryl phosphine oxide.

9. The composition of claim 7 wherein the photoinitiator comprises about 0.1 to about 6 weight percent of the composition.

* * * * *